US011876810B2

(12) United States Patent
Choi et al.

(10) Patent No.: US 11,876,810 B2
(45) Date of Patent: Jan. 16, 2024

(54) METHOD OF DETECTING MALICIOUS NODE IN BUS NETWORK SYSTEM AND NODE APPARATUS

(71) Applicant: DAEGU GYEONGBUK INSTITUTE OF SCIENCE AND TECHNOLOGY, Daegu (KR)

(72) Inventors: Ji Woong Choi, Seoul (KR); Woo Jin Jeong, Busan (KR); Eun Min Choi, Gyeongsangnam-do (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 357 days.

(21) Appl. No.: 17/395,121

(22) Filed: Aug. 5, 2021

(65) Prior Publication Data

US 2022/0182399 A1    Jun. 9, 2022

(30) Foreign Application Priority Data

Dec. 4, 2020    (KR) .......................... 10-2020-0169000

(51) Int. Cl.
*G06F 21/00*    (2013.01)
*H04L 9/40*    (2022.01)
*H04L 12/40*    (2006.01)
*H04K 3/00*    (2006.01)

(52) U.S. Cl.
CPC .......... *H04L 63/1416* (2013.01); *H04K 3/60* (2013.01); *H04L 12/40* (2013.01); *H04L 63/1441* (2013.01); *H04L 2012/40273* (2013.01)

(58) Field of Classification Search
None
See application file for complete search history.

(56) References Cited

U.S. PATENT DOCUMENTS

2015/0271201 A1* 9/2015 Ruvio ................. B60R 16/0231
                                                          726/23
2015/0358351 A1* 12/2015 Otsuka .................... H04L 12/66
                                                          726/23
2017/0208065 A1* 7/2017 Yajima ................ H04L 63/1416
(Continued)

FOREIGN PATENT DOCUMENTS

KR    10-2019-0003112 A    1/2019

*Primary Examiner* — Maung T Lwin
(74) *Attorney, Agent, or Firm* — PEARNE & GORDON LLP (57) ABSTRACT

A method of detecting a malicious node in a bus network system includes pre-storing, by a receiving node, autocorrelation characteristics and node identifiers for each signal received from nodes excluding than the receiving node in a bus network system, receiving, by the receiving node, a target signal from any one of the nodes, generating, by the receiving node, an autocorrelation characteristic of the target signal, searching for an autocorrelation characteristic, which is identical to the autocorrelation characteristic of the target signal or similar to the autocorrelation characteristic of the target signal by a reference level or more, among the autocorrelation characteristics of each of the signals stored by the receiving node, determining, by the receiving node, whether a first node identifier matching the searched autocorrelation characteristic and a second node identifier extracted from a packet transmitted to the target signal are the same.

11 Claims, 8 Drawing Sheets

(56) References Cited

U.S. PATENT DOCUMENTS

2018/0196941 A1* 7/2018 Ruvio ................ H04L 63/1425
2018/0248766 A1* 8/2018 Ezra .................. H04L 63/1416
2019/0342183 A1* 11/2019 Nunna .................. G06N 3/006

* cited by examiner

METHOD OF DETECTING MALICIOUS NODE IN BUS NETWORK SYSTEM AND NODE APPARATUS

CROSS-REFERENCE TO RELATED APPLICATION

This application claims the benefit under 35 U.S.C. § 119(a) of Korean Patent Application No. 10-2020-0169000, filed on Dec. 4, 2020, in the Korean Intellectual Property Office, the entire disclosure of which is incorporated herein by reference for all purposes.

FIELD

The following description relate to a method of detecting a malicious node in a bus network.

BACKGROUND

Currently, most automobiles are using various and complex sensors and devices. Each device in automobiles is controlled by an electronic control unit (ECU), which is an individual electronic control device. Currently, ECUs or devices in automobiles use controller area network (CAN) communication which is a standard that supports communication between devices without a host. The CAN communication is based on a bus structure. Since the ECU is connected to a bus of the CAN, which is a vehicle network, through an open communication channel, the ECU or individual devices may be vulnerable to hacking.

The related art for detecting an external attack is a method of mainly analyzing frequency characteristics of a signal received by a node connected to a bus. The related art allows one node to store in advance attenuation characteristics for each channel of signals received from other nodes and then compare a pattern of the received signals with stored information, thereby determining whether a node currently transmitting a signal is a malicious node. The related art requires a process of processing a signal in a frequency domain, and therefore, has high signal processing complexity for attack detection. In addition, the related art requires a signal processing time, and therefore, takes more time for attack detection.

SUMMARY

The following description is to provide a technology for detecting a malicious node based on characteristics of a signal of a node in a time domain in a bus-based system.

In one general aspect, there is provided a method of detecting a malicious node in a bus network system includes pre-storing, by a receiving node, autocorrelation characteristics and node identifiers for each signal received from nodes excluding the receiving node in a bus network system, receiving, by the receiving node, a target signal from any one of the nodes, generating, by the receiving node, an autocorrelation characteristic of the target signal, searching for an autocorrelation characteristic, which is identical to the autocorrelation characteristic of the target signal or similar to the autocorrelation characteristic of the target signal by a reference level or more, among the autocorrelation characteristics of each of the signals stored by the receiving node, determining, by the receiving node, whether a first node identifier matching the searched autocorrelation characteristic and a second node identifier extracted from a packet transmitted to the target signal are the same, and when the first node identifier and the second node identifier are not the same, determining, by the receiving node, any one node as the malicious node.

In another aspect, there is provided a node apparatus for detecting a malicious node in a bus network system includes an interface device configured to receive a target signal from any one of other nodes in a bus network system, a storage device configured to pre-store reference autocorrelation characteristics and node identifiers for each signal received from the other nodes, and an processor configured to search for an autocorrelation characteristic, which is identical to an autocorrelation characteristic of the target signal or similar to the autocorrelation characteristic of the target signal by a reference level or more, among reference autocorrelation characteristics stored in the storage device, and determine any one node as the malicious node when a first node identifier matching the searched autocorrelation characteristic and a second node identifier extracted from a packet transmitted to the target signal are the same.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The technology described below is applicable to a bus topology network-based system. Hereinafter, a bus topology network-based system will be briefly referred to as a bus network system.

A bus network has a network structure that refers to a set of nodes connected through a shared communication path called a bus. When one node (station) on the bus network transmits a signal, all other nodes on the network receive the same signal through a bus. Individual processing is performed so that individual nodes receive only messages that have been assigned to their own nodes. A representative message protocol for the bus network may include Ethernet.

A node refers to an individual device connected to the bus network. There may be various nodes such as personal computer devices, household appliances, and individual devices (electronic control unit (ECU)) in a vehicle.

The technology described below is a technology for detecting a malicious node in a bus network system. As the bus network system, there may be various systems. Hereinafter, for convenience of description, a vehicle network will be mainly described. As the vehicle network, a controller area network (CAN) is mainly used. Furthermore, the vehicle network may be based on the Ethernet. The technology described below is not limited to a communication protocol and may be universally applied to a bus-based network.

The malicious node refers to a node that is hacked and performs malicious operations in an internal system.

Figure 1:
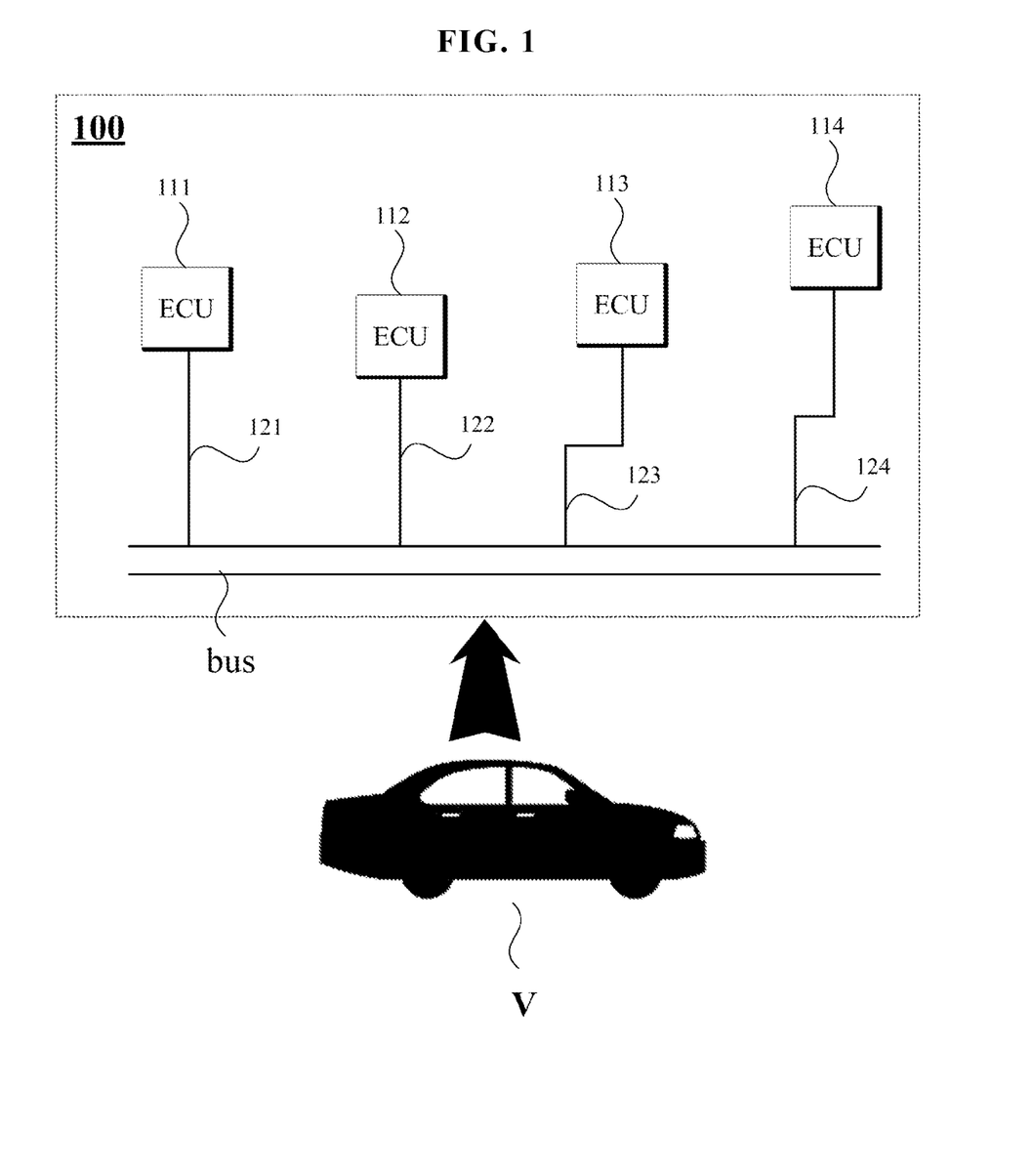
FIG. 1 is a diagram illustrating an example of a bus network system.

FIG. 1 illustrates an example of a bus network system 100. FIG. 1 is an example of a vehicle network system of a vehicle V. As illustrated in FIG. 1, nodes 111, 112, 113, and 114 in the bus network system 100 are all connected to a shared network bus. In FIG. 1, the node shows an ECU of a vehicle. Individual devices (various sensors, infotainment devices, or the like) built into a vehicle are usually controlled by a dedicated ECU. Referring to FIG. 1, the nodes 111, 112, 113, and 114 have physically connected paths which are different. For example, the nodes 111, 112, 113, and 114 may have different lengths, shapes, or the like of paths connected to a public bus. Accordingly, nodes in the bus network system 100 may have different physical channel characteristics.

Figure 2A:
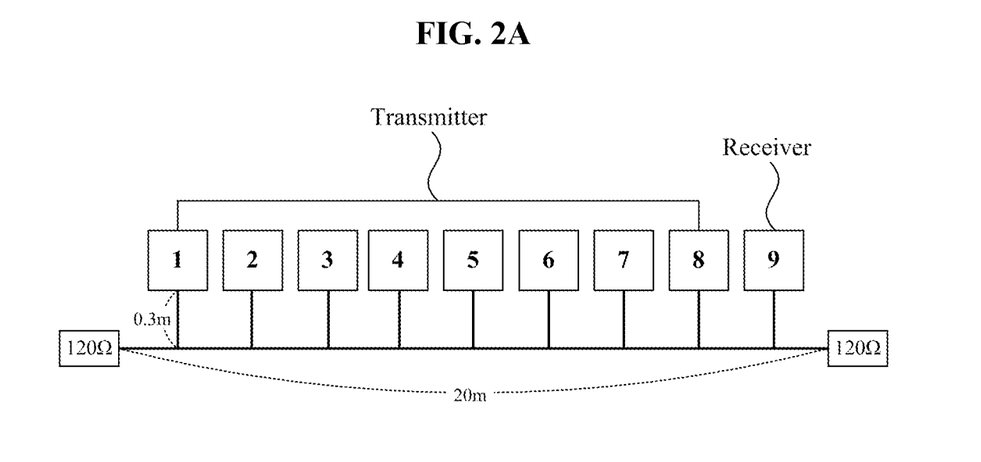
FIGS. 2A and 2B are a diagram illustrating an experimental result of analyzing channel characteristics of a node in a bus network.
Figure 2B:
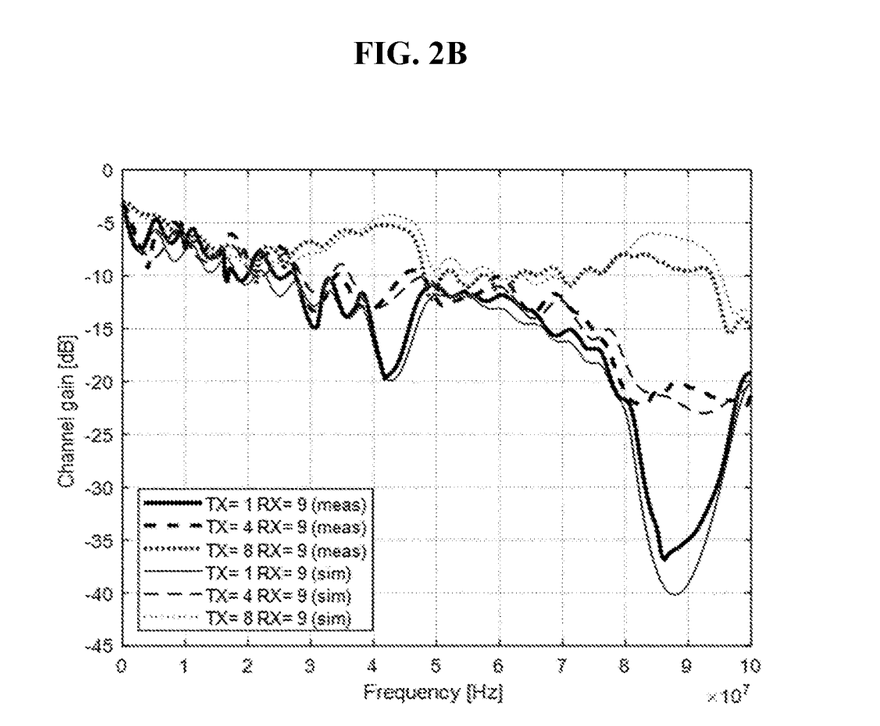

FIG. 2 is an experimental result of analyzing channel characteristics of a node in a bus network. FIG. 2 illustrates results of an experiment using a bus network system constructed by a researcher in a laboratory.

FIG. 2A is a structure of a bus network system used in the experiment. The system of FIG. 2A is a CAN bus-based system. Referring to FIG. 2A, the total number of nodes are nine (Nos. 1 to 9), a length of a public bus is 20 m, and distances from the public bus to each node are 0.3 m. That is, FIG. 2A illustrates a bus network system in which the distances from the public bus to the nodes are the same. However, locations of individual nodes are different.

FIG. 2B is a result of measuring channel characteristics of the bus network system of FIG. 2A. This is a case where node No. 9 is a receiving node and the remaining nodes are transmitting nodes. FIG. 2B is a result of measuring channel characteristics for a case in which nodes Nos. 1, 4, and 8 transmit a signal to node No. 9. Referring to FIG. 2B, it can be seen that when the transmitting nodes (Nos. 1, 4, and 8) transmit a signal to the receiving node (No. 9), all the channel characteristics are different. That is, as the researchers expected, it can be seen that channel characteristics between any one reference node and other nodes in the bus network have different physical characteristics according to the type of the other nodes.

Figure 3A:
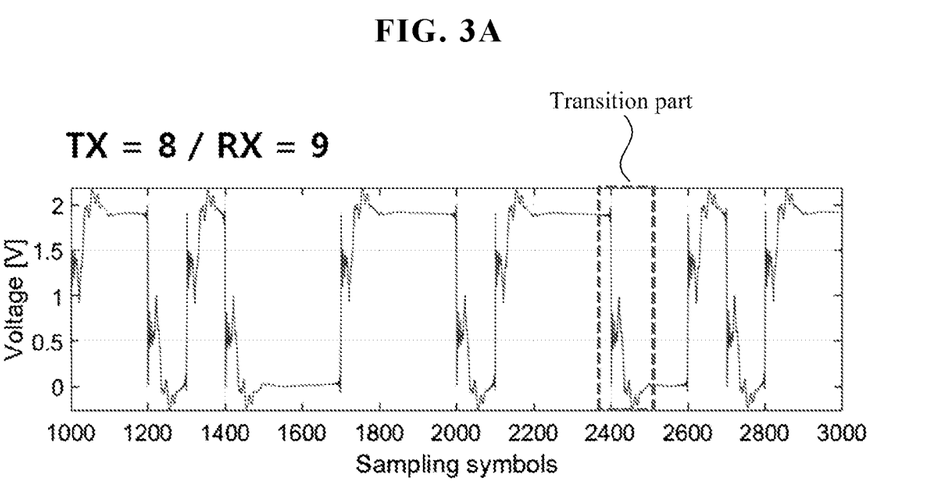
FIGS. 3A and 3B are a diagram illustrating an experimental result of analyzing characteristics of the node signal in a time domain in the bus network.
Figure 3B:
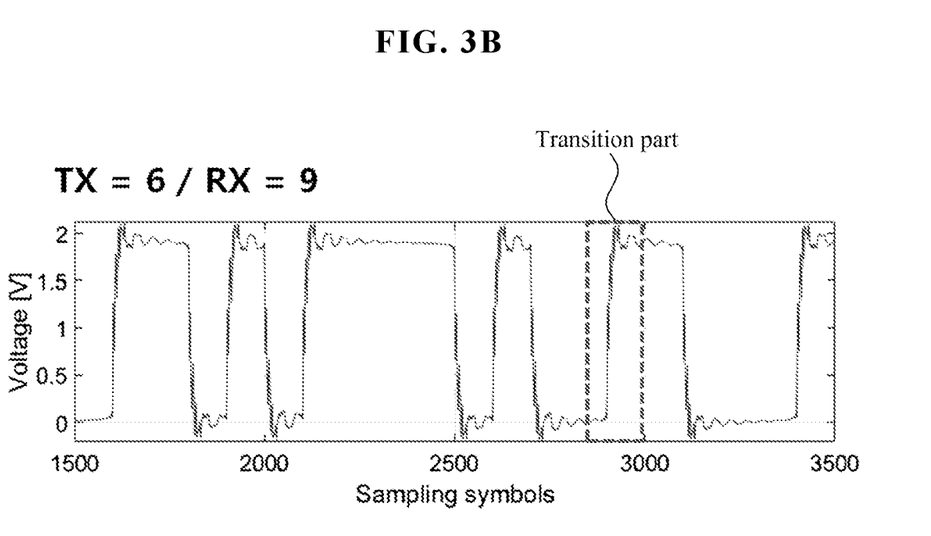

FIG. 3 illustrates experimental results of analyzing characteristics of a node signal in a time domain in the bus network. FIGS. 3A and 3B illustrate experimental results of analyzing channel characteristics between nodes in a time domain in the bus network of FIG. 2A. FIG. 3A illustrates a case in which a transmitting node TX is node No. 8 and a receiving node RX is node No. 9. FIG. 3B illustrates a case in which the transmitting node TX is node No. 6 and the receiving node RX is node No. 9. That is, when signals are received from different transmitting nodes (No. 8 and No. 6) based on the receiving node No. 9, a result of comparing channel characteristics in the time domain is illustrated. Referring to FIG. 3, it can be seen that when the transmitting nodes are different, the channel characteristics are different, and in particular, an area marked by Transition part shows a completely different pattern. Therefore, the signal characteristics in the time domain may be used to determine a malicious node.

Figure 4:
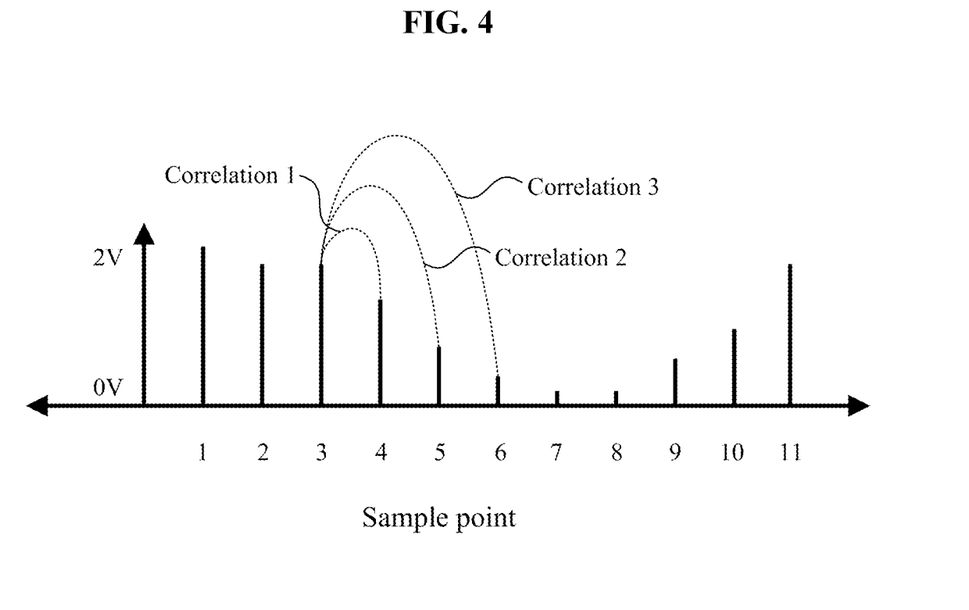
FIG. 4 is a diagram illustrating an example of autocorrelation analysis for the node signal.

The technology described below uses autocorrelation analysis to identify the signal characteristics in the time domain. Autocorrelation is a technique of analyzing a predetermined correlation in time series data. FIG. 4 illustrates an example of autocorrelation analysis for a node signal. A horizontal axis represents a sample point of a signal. The sample point refers to a specific sample in which a received signal is divided into units of a predetermined time interval or a predetermined frame length. FIG. 4 illustrates a case in which the sample point has all 11 samples. A vertical axis represents a signal value, and FIG. 4 illustrates an example using signal strength V. That is, the vertical axis represents a physical characteristic value of the received signal. The autocorrelation is a result of calculating a correlation between one sample and samples in other sections based on. Autocorrelation 1 represents an autocorrelation between sample 3 and sample 4, autocorrelation 2 represents an autocorrelation between sample 3 and sample 5, and autocorrelation 3 represents an autocorrelation between sample 3 and sample 6.

Autocorrelation values of the samples may be calculated using Equation 1 below. Equation 1 represents a value obtained by normalizing a product of a reference sample and a sample separated by n from the reference sample to a square of a sample value.

$$S_n[k] = \frac{\sum s[k] \times s[k+n]}{\sum s[k]^2} \quad \text{[Equation 1]}$$

k denotes a sample number, and n denotes a distance between samples. s[k] denotes a physical value of sample k.

$S_n[k]$ denotes an autocorrelation value with a sample at a distance n based on the sample k. $S_n[k]$ denotes a result value obtained by accumulating autocorrelation values with other samples based on a reference sample k. [k] and s[k] are real numbers, and k and n are natural numbers.

Figure 5A:
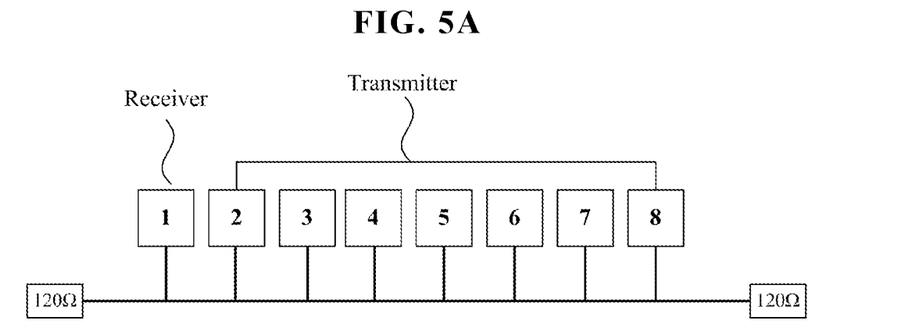
FIGS. 5A and 5B are a diagram illustrating an example of an autocorrelation result for the node signal in the bus network.
Figure 5B:
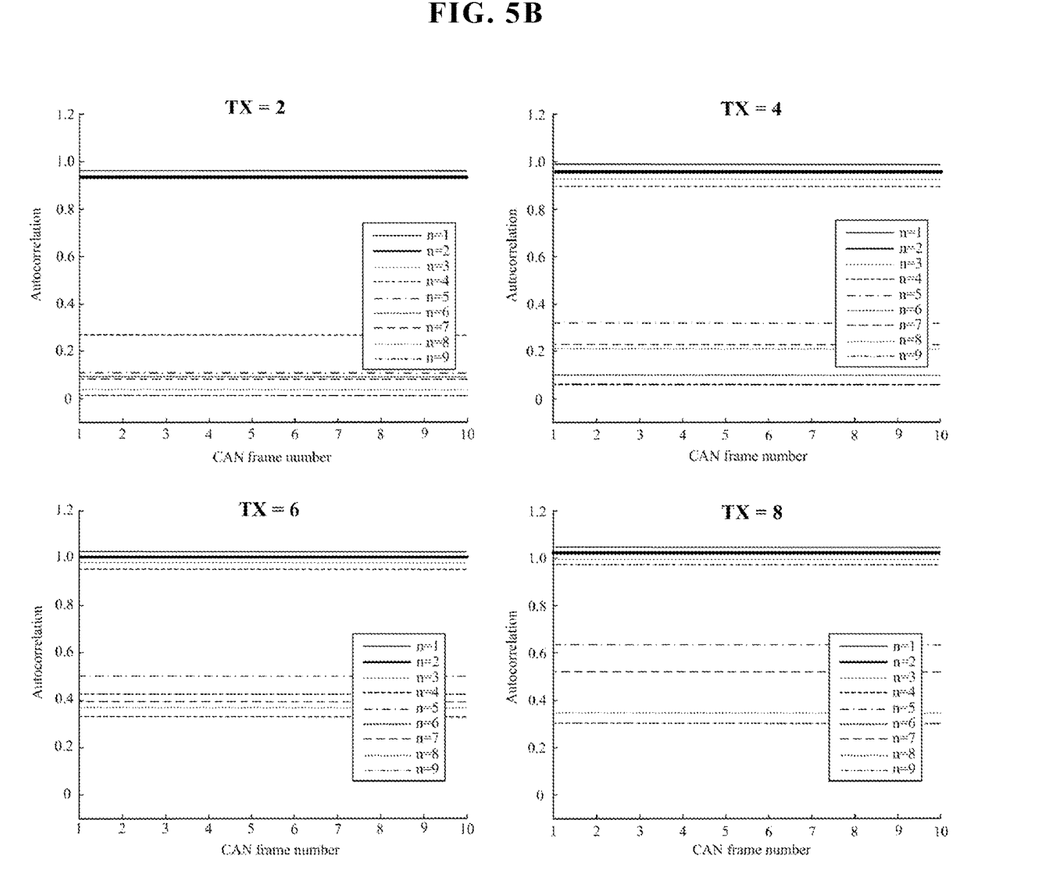

FIG. 5 illustrates an example of an autocorrelation result for the node signal in the bus network. FIG. 5 illustrates results of calculating autocorrelation values between nodes in a bus network system constructed by a researcher. FIG. 5A illustrates a bus network system constructed by a researcher. The bus network system has eight nodes (Nos. 1 to 8). Node No. 1 may be a receiving node and the remaining nodes may be transmitting nodes. FIG. 5B is a part of the result of calculating the correlation between the nodes in the bus network system of FIG. 5A. FIG. 5B illustrates correlation values in the cases of receiving node No. 1 and transmitting node No. 2 (TX=2), receiving node No. 1 and transmitting node No. 3 (TX=3), receiving node No. 1 and transmitting node No. 6 (TX=6), and receiving node No. 1 and transmitting node No. 7 (TX=7).

FIG. 5B illustrates a result of dividing a received signal into CAN frames Nos. 1 to 10 and calculating a correlation value. Referring to FIG. 5B, it can be seen that the received signal has a constant value without being affected by a data pattern or the like. This means that channel characteristics between specific nodes are unique. In addition, it can be seen that the patterns of the autocorrelation are different when the transmitting nodes are different based on one receiving node. Accordingly, the autocorrelation value calculated according to the definition described above may be used as information for identifying a node.

Figure 6:
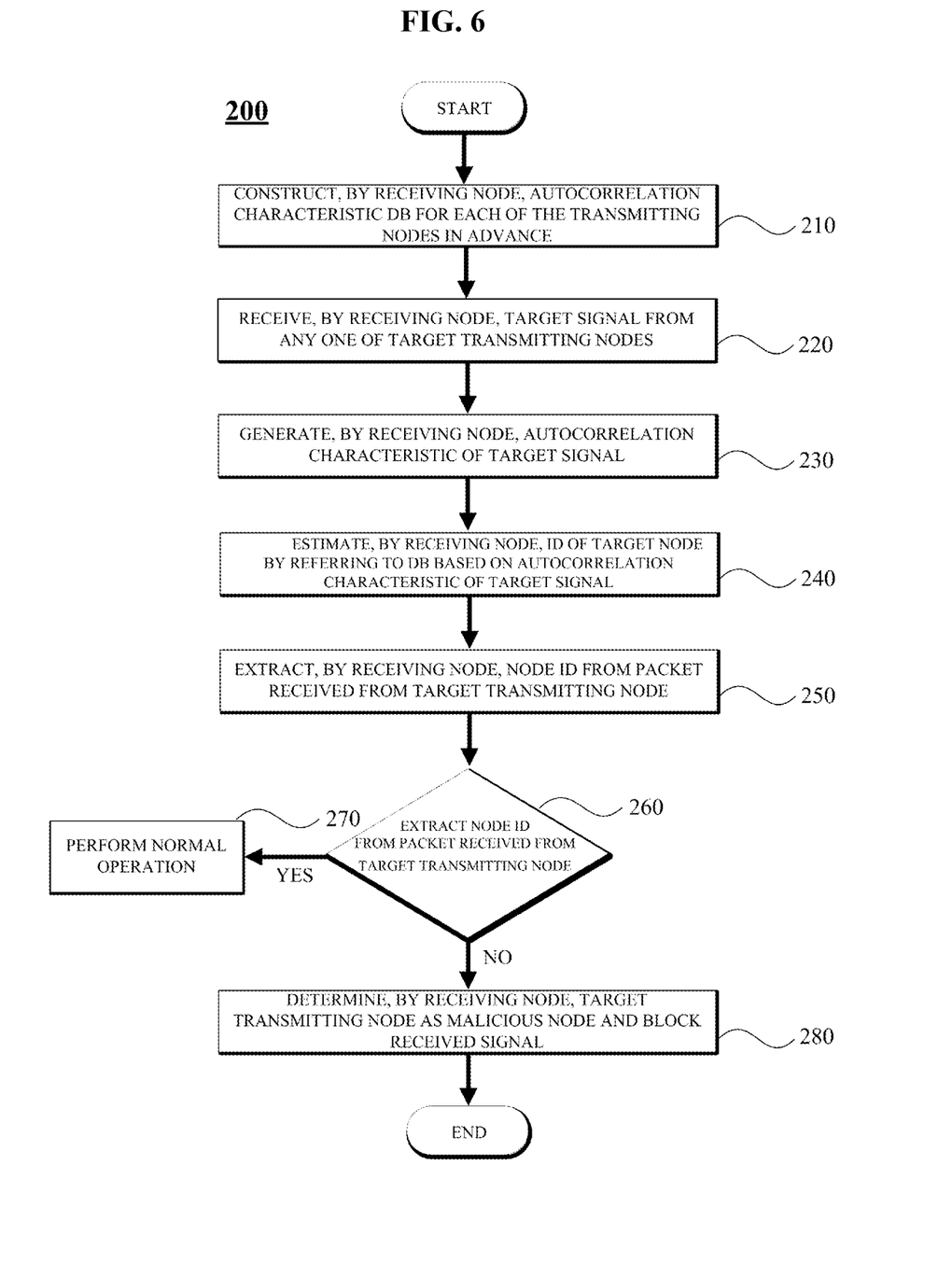
FIG. 6 is a flowchart of a process of processing a malicious node in a bus network system.

FIG. 6 is a flowchart of a process 200 of processing a malicious node in a bus network system. FIG. 6 will be described based on the operation of one receiving node. In the bus network system, all individual nodes may perform the operations illustrated in FIG. 6. The receiving node determines whether the transmitting node is a malicious node based on the signal received from another node (transmitting node).

First, the receiving node needs to analyze the autocorrelation characteristic between other nodes and the receiving node in the bus network system in advance (210). It is assumed that there are no malicious nodes at the time point of analyzing the autocorrelation characteristic in advance. The receiving node calculates the autocorrelation characteristics with each of the other nodes while receiving signals from each of the other nodes (the remaining nodes) in the bus network system. Since the other nodes except the receiving node may transmit signals to the receiving node, the other nodes except the receiving node are called transmitting nodes.

The receiving node calculates the autocorrelation value of Equation 1 for each transmitting node. The receiving node may store the autocorrelation characteristics (autocorrelation values) for each transmitting node and an identifier (ID) of the corresponding node in a table form (210). This table may be called an autocorrelation characteristic database (DB). Each receiving node can provide individual autocorrelation characteristic DBs in relation to the other nodes.

Thereafter, the receiving node receives a signal from any one of the other nodes (220). Here, it should be determined whether any one node is a malicious node. Hereinafter, any node to be analyzed is called a target node, and a signal to be analyzed which the target node transmits is called a target signal. The receiving node receives the target signal from the target node (220).

The receiving node generates an autocorrelation characteristic of the target signal (230). The receiving node calculates an autocorrelation value of a current time point of the target signal through the operation as in Equation 1.

The receiving node searches whether there is an autocorrelation characteristic having the same value in the autocorrelation characteristic DB based on the autocorrelation characteristic of the target signal (240). In this case, when there is the same value as the autocorrelation value of the target signal among the values stored in the autocorrelation characteristic DB, the receiving node extracts a node identifier (ID) having the same autocorrelation characteristic (240). The receiving node is to estimate the target node based on the autocorrelation characteristic.

Furthermore, when there is a value similar to the autocorrelation value of the target signal among the values stored in the autocorrelation characteristic DB, the receiving node may extract the corresponding node identifier. That is, when the receiving node identifies a specific node based on the autocorrelation value, even when the calculated values are not the same, it is possible to estimate a node having a close (similar) value within a predetermined range as a transmitting node.

The receiving node extracts the identifier (ID) of the node that has transmitted the target signal from a packet transmitted by the target signal (250). Depending on the communication protocol, the receiving node may identify the node that has transmitted the current packet.

The receiving node determines whether a node ID estimated in operation 240 and a node ID extracted from the packet are the same (260). When the node ID estimated in operation 240 and the node ID extracted from the packet are the same (YES in 260), the receiving node regards the target node as a normal node and performs a normal operation (270).

When the node ID estimated in operation 240 is not the same as the node ID extracted from the packet (NO in 260), the receiving node determines the target node as a malicious node (280).

Thereafter, the receiving node may operate to block the signal transmitted by the target node (280). For example, the receiving node may ignore a signal currently transmitted by the target node and a signal to be transmitted in the future. Alternatively, the receiving node may actively transmit a jam signal in order to block the signal transmitted by the target node.

Meanwhile, the receiving node may analyze the packet transmitted to the target signal and perform a malicious code determination process only in the case of the receiving node that is the receiving target of the target signal.

Furthermore, the receiving node may analyze the packet transmitted to the target signal and perform the malicious code determination process even when the receiving node is not the receiving node that is the receiving target of the target signal. Alternatively, the receiving node may perform the malicious node determination process for the target signal currently being received without performing a receiving node determination process. In this case, when the receiving node determines the target node, the receiving node may transmit a warning message to the node that is the receiving target of the target signal. Alternatively, the receiving node may transmit the jam signal in order to block the signal transmitted by the target node.

Figure 7:
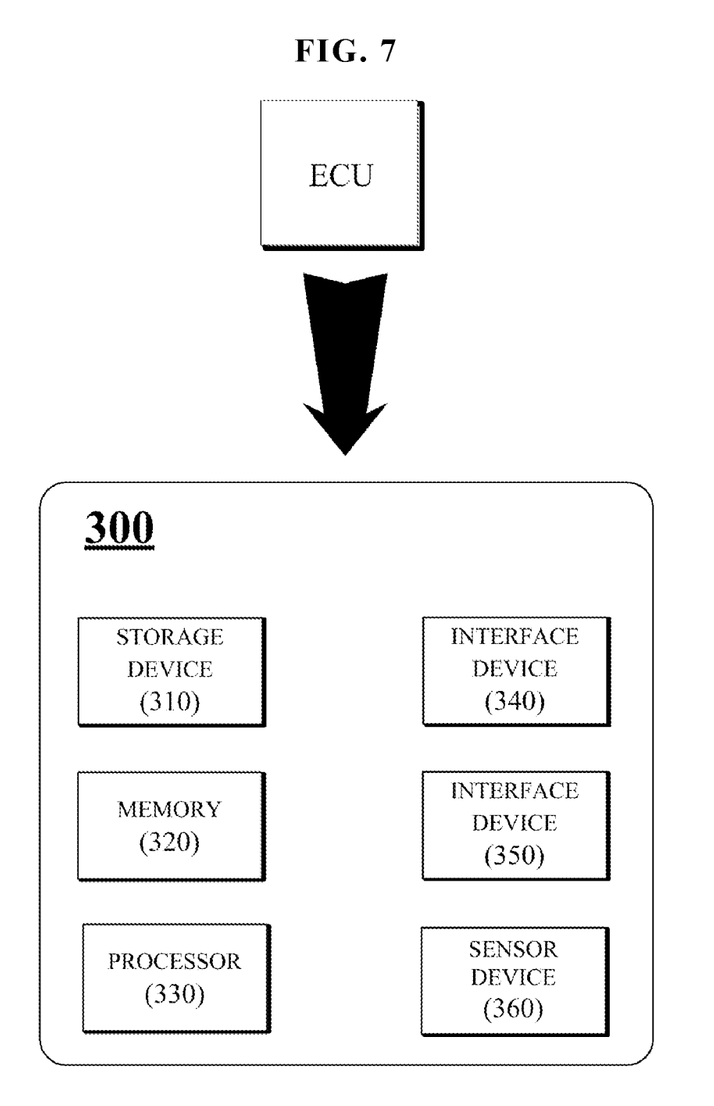
FIG. 7 is a diagram illustrating an example of a structure of a node apparatus of the bus network system.

FIG. 7 illustrates an example of a structure of a node apparatus 300 of the bus network system. FIG. 7 illustrates an example illustrating a node apparatus corresponding to an ECU of a vehicle. However, as described above, the node apparatus is not necessarily limited to a specific device of a vehicle. The node apparatus may be any type of node connected to the bus network system, regardless of the implementation type.

The node apparatus 300 includes a storage device 310, a memory 320, an processor 330, and an interface device 340. Furthermore, the node apparatus 300 may further include a communication device 350 and a sensor device 360.

The storage device 310 may store the autocorrelation characteristic DB described above. That is, in the node apparatus 300, the storage device 310 may store reference autocorrelation characteristics and node identifiers for each signal received from other nodes. The autocorrelation characteristic stored in the autocorrelation characteristic DB may be referred to as a reference autocorrelation characteristic.

The storage device 310 may store code or a program for determining a malicious node. For example, the storage device 310 may store malicious node determination code in the form of firmware.

The memory 320 may temporarily store information that is generated or necessary in the malicious node determination process.

The interface device 340 refers to a device having a configuration for transmitting/receiving a signal (packet) in a bus-based network. The interface device 340 may include a physical device and a communication protocol for internal communication.

The interface device 340 receives signals from other nodes. In the node apparatus 300, the interface device 340 also transmits a signal to other nodes.

The communication device 350 refers to a data transmission/reception configuration that is present separately from the interface device 340. For example, the communication device 350 may be a switch connected to Ethernet. In a broad sense, the interface device 340 may be a configuration including the communication device 350.

The processor 330 is a configuration for processing data or information. The processor 330 may be a device such as a CPU, an AP, or a chip in which a program is embedded.

The processor 330 may process a signal to be transmitted and received according to the communication protocol. For example, The processor 330 may extract an identifier of a transmitting node by analyzing packets received from other nodes.

The processor 330 may generate the above-described autocorrelation characteristic DB using signals received from each of the other nodes.

The processor 330 may generate an autocorrelation characteristic for a signal currently received at the transmitting node. The processor 330 may calculate an autocorrelation value for the signal currently received at the transmitting node through an arithmetic operation such as Equation 1.

The processor 330 may determine whether the target node is a malicious node using the code or program stored in the storage device 310.

The processor 330 may search for an autocorrelation characteristic, which is identical to the autocorrelation characteristic currently analyzing the target signal of the transmitting node or similar to the autocorrelation characteristic currently analyzing the target signal of the transmitting node, in the autocorrelation characteristic DB stored in the storage device by more than a reference level.

The processor 330 may determine an identifier (first identifier) of a matching node by searching for an autocorrelation characteristic, which is identical to the autocorrelation characteristic of the target signal to be currently analyzed or similar to the autocorrelation characteristic of the target signal to be currently analyzed, among the reference autocorrelation characteristics.

The identifier of the target node may be stored in a header or other fields of the packet. Accordingly, The processor 330 may determine an identifier (second identifier) of the target node by analyzing the packet transmitted as the target signal.

The processor 330 may determine the target node as a malicious node when the first node identifier and the second node identifier extracted from the packet transmitted as the target signal are different.

When The processor 330 determines that the target node is a malicious node, The processor 330 may control to ignore a signal received from the target node.

When it is determined that the target node is a malicious node, The processor 330 may control to transmit the jam signal for blocking the signal transmitted by the target node through the interface device 340.

The processor 330 may analyze the packet transmitted to the target signal to determine whether the target node is a malicious node when the node apparatus 300 is a receiving target of the target signal.

Alternatively, even when the node apparatus 300 is not a receiving target of the target signal, the processor 330 may analyze the target signal because the node apparatus 300 receives the signal due to the characteristics of the bus network. When the receiving target of the target signal is not the node apparatus 300 but the target node is determined to be a malicious node, the processor 330 may control to transmit a warning message to the node apparatus 300 which is the receiving target of the target signal. Alternatively, the processor 330 may control to transmit the jam signal for blocking the signal transmitted by the target node through the interface device 340.

The sensor device 360 is a device for collecting surrounding information. The sensor device 360 may be any one of an image sensor, a distance sensor, an illuminance sensor, and a pressure sensor of a vehicle.

The node apparatus 300 is a device connected to the bus network system and may be a dedicated node for identifying a malicious node.

In addition, the method of detecting a malicious node in a bus network system as described above may be implemented by a program (or application) including an executable algorithm that may be executed in a computer. The program may be stored and provided in a non-transitory computer readable medium.

The non-transitory computer readable medium is not a medium that stores data therein for a short time, such as a register, a cache, a memory, or the like, and refers a medium that semi-permanently stores data therein and is readable by a device. Specifically, various applications or programs described above may be stored and provided in a non-transitory computer readable medium such as a compact disc (CD), a digital video disk (DVD), a hard disk, a Blu-ray disc, a universal serial bus (USB), a memory card, a read-only memory (ROM), a programmable read only memory (PROM), an erasable PROM (EPROM), an electrically EPROM (EEPROM), or a flash memory.

The transitory readable medium refers to various RAMs such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DRRAM).

The described-above technology uses an autocorrelation characteristic, which is one of the physical characteristics of a node signal in a bus-based system, to detect a malicious node within a short time.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of detecting a malicious node in a bus network system, comprising:
   pre-storing, by a receiving node, autocorrelation characteristics and node identifiers for each signal received from nodes excluding the receiving node in a bus network system, wherein the autocorrelation characteristic divides any one of the signals that the receiving node receives from other nodes through a bus into a plurality of samples in units of predetermined time interval or a frame length, and is a value obtained by calculating a correlation between any one and the remaining samples of the plurality of samples;
   receiving, by the receiving node, a target signal from any one of the nodes;
   generating, by the receiving node, an autocorrelation characteristic of the target signal;
   searching for an autocorrelation characteristic, which is identical to the autocorrelation characteristic of the target signal or similar to the autocorrelation characteristic of the target signal by a reference level or more, among the autocorrelation characteristics of each of the signals stored by the receiving node;
   determining, by the receiving node, whether a first node identifier matching the searched autocorrelation characteristic and a second node identifier extracted from a packet transmitted to the target signal are the same; and
   when the first node identifier and the second node identifier are not the same, determining, by the receiving node, any one node as the malicious node.

2. The method of claim 1, wherein physical channel characteristics between the receiving node and each of the nodes are different.

3. The method of claim 1, wherein the autocorrelation characteristic is determined by correlation values calculated by the following equation:

$$S_n[k] = \frac{\Sigma\, s[k] \times s[k+n]}{\Sigma\, s[k]^2},$$

(k denotes a sample number, n denotes a distance between samples, and $S_n[k]$ denotes a correlation value, and s[k] denotes a physical value of a sample signal).

4. The method of claim 1, wherein the receiving node ignores the signal received from the any one node determined as the malicious node or transmits a jam signal for blocking a signal transmitted by the any one node.

5. The method of claim 1, wherein the receiving node analyzes the packet transmitted to the target signal and performs the following operations after the generating of the autocorrelation characteristic of the target signal only when the receiving node is a receiving target of the target signal.

6. The method of claim 1, wherein, when the receiving node analyzes the packet transmitted to the target signal and determines that a receiving target of the target signal is not the receiving node and the any one node is the malicious node, the receiving node transmits a warning message to a node that is the receiving target of the target signal or transmits a jam signal for blocking a signal transmitted by the any one node.

7. A node apparatus for detecting a malicious node in a bus network system, comprising:
   an interface device configured to receive a target signal from any one of other nodes in a bus network system;
   a storage device configured to pre-store reference autocorrelation characteristics and node identifiers for each signal received from the other nodes; and
   a processor configured to search for an autocorrelation characteristic, which is identical to an autocorrelation characteristic of the target signal or similar to the autocorrelation characteristic of the target signal by a reference level or more, among reference autocorrelation characteristics stored in the storage device, wherein the processor divides the target signal into a plurality of samples in units of a predetermined time interval or a frame length, and calculates the autocorrelation characteristic of the target signal by calculating a correlation between any one and each of the remaining samples of the plurality of samples, and determine any one node as the malicious node when a first node identifier matching the searched autocorrelation characteristic and a second node identifier extracted from a packet transmitted to the target signal are the same.

8. The node apparatus of claim 7, wherein the autocorrelation characteristic is composed of correlation values calculated by the following equation:

$$S_n[k] = \frac{\Sigma\, s[k] \times s[k+n]}{\Sigma\, s[k]^2},$$

(k denotes a sample number, n denotes a distance between samples, and $S_n[k]$ denotes a correlation value, and s[k] denotes a physical value of a sample signal).

9. The node apparatus of claim 7, wherein the processor controls a signal received from the any one node determined as the malicious node to be ignored, or
   controls a jam signal for blocking a signal transmitted by the any one node to be transmitted through the interface device.

10. The node apparatus of claim 7, wherein the processor analyzes the packet transmitted to the target signal and determines whether the any one node is the malicious node only when the node apparatus is a receiving target of the target signal.

11. The node apparatus of claim 7, wherein, when the processor determines that a receiving target of the target signal is not the node apparatus and the any one node is determined as the malicious node, the processor controls a warning message to be transmitted to the node apparatus that is the receiving target of the target signal or controls a jam signal for blocking a signal transmitted by the any one node to be transmitted.

\* \* \* \* \*